(12) United States Patent
Khoo

(10) Patent No.: US 8,910,418 B2
(45) Date of Patent: Dec. 16, 2014

(54) FLOATABLE PLANT GROWTH SYSTEM AND A FLOATATION TRAY FOR USE WITH THE SYSTEM

(76) Inventor: Khay Chong Khoo, Selangor (MY)

( * ) Notice: Subject to any disclaimer, the term of this patent is extended or adjusted under 35 U.S.C. 154(b) by 503 days.

(21) Appl. No.: 13/262,225

(22) PCT Filed: Aug. 19, 2010

(86) PCT No.: PCT/MY2010/000148
§ 371 (c)(1),
(2), (4) Date: Sep. 29, 2011

(87) PCT Pub. No.: WO2011/062470
PCT Pub. Date: May 26, 2011

(65) Prior Publication Data
US 2012/0036773 A1    Feb. 16, 2012

(30) Foreign Application Priority Data

Nov. 18, 2009  (MY) .............................. PI 20094892

(51) Int. Cl.
*A01G 31/02*  (2006.01)
*A01G 9/10*  (2006.01)
*A01G 9/00*  (2006.01)

(52) U.S. Cl.
CPC ................ *A01G 9/104* (2013.01); *A01G 31/02* (2013.01); *A01G 9/00* (2013.01)
USPC .............................. 47/59 R; 47/65.7; 47/66.7

(58) Field of Classification Search
CPC ......... A01G 9/021; A01G 9/00; A01G 9/104; A01G 31/00; A01G 31/04; A01G 31/042; A01G 31/06; A01G 31/02
USPC ......... 47/65.9, 66.5, 75, 86, 59 R, 62 R, 65.5, 47/65.7, 73, 79, 87; 220/560
See application file for complete search history.

(56) References Cited

U.S. PATENT DOCUMENTS

| 3,810,329 | A | * | 5/1974 | Lecuru et al. | ...................... 47/87 |
| 4,133,141 | A | * | 1/1979 | Lee | ................................... 47/79 |
| 4,242,834 | A | * | 1/1981 | Olsen | ................................ 47/73 |
| 4,296,569 | A | * | 10/1981 | Edwards | ........................... 47/73 |

(Continued)

FOREIGN PATENT DOCUMENTS

| EP | 2324696 A1 | 5/2011 |
| WO | 96/35326 | 11/1996 |

OTHER PUBLICATIONS

Supplementary European Search Report issued in European Application No. EP 10 83 1837 dated Mar. 26, 2013 (6 pages).

(Continued)

*Primary Examiner* — Monica Williams
*Assistant Examiner* — Joshua Huson
(74) *Attorney, Agent, or Firm* — Martine Penilla Group, LLP

(57) ABSTRACT

A floatable plant growth system is provided. The system comprises an upper tray (10) and a lower tray (20). The upper tray has a plurality of downwardly tapering cells (11) for receiving plant growth material, with each of the plant cells having an opening (13) at its bottom. The lower tray has a plurality of upwardly tapering cells (21) that trap air, enabling the system to float in use. The upper tray is removably mateable with the lower tray such that the plant cells of the upper tray are located in the space (27) between the air cells of the lower tray. The lower tray is provided with a plurality of openings (26). When the upper and lower trays are mated together and placed in a body of liquid, liquid enters the mated tray configuration (10, 20) through the openings (26) of the lower tray, fills the space (27) that is below the plant cells (11) between the air cells (21) of the lower tray, and in use may be taken up through the bottom opening (13) of each upper tray plant cell.

18 Claims, 14 Drawing Sheets

(56) References Cited

U.S. PATENT DOCUMENTS

| | | | |
|---|---|---|---|
| 4,355,484 A | | 10/1982 | Mandish |
| 4,468,885 A | | 9/1984 | Mandish |
| 4,513,533 A | * | 4/1985 | Gething et al. .................. 47/63 |
| 5,203,109 A | * | 4/1993 | Simon et al. ..................... 47/75 |
| 5,261,185 A | * | 11/1993 | Koide et al. ..................... 47/63 |
| 5,324,657 A | * | 6/1994 | Tanny .......................... 435/420 |
| 5,435,098 A | * | 7/1995 | Koide et al. ..................... 47/65 |
| 6,253,487 B1 | * | 7/2001 | Yoshida et al. ................. 47/33 |
| 6,453,613 B1 | * | 9/2002 | Gratz ............................... 47/84 |
| 8,555,547 B2 | * | 10/2013 | Hashimoto et al. ............. 47/79 |
| 2008/0120903 A1 | | 5/2008 | Fair et al. |

OTHER PUBLICATIONS

Second Office Action issued in Chinese Patent Application No. 201080015015.5 dated Apr. 23, 2013 and English translation thereof (10 total pages).

Third Office Action issued in Chinese Patent Application No. 201080015015.5 dated Aug. 7, 2013 and English translation thereof (8 total pages).

Communication dated Dec. 12, 2013 forwarding Third Party Observation submitted for EP Application No. 20100831837.9 (3 total pages).

* cited by examiner

FLOATABLE PLANT GROWTH SYSTEM AND A FLOATATION TRAY FOR USE WITH THE SYSTEM

This invention relates to a floatable plant growth system and a floatation tray for use with the system and with plant holding structures.

DESCRIPTION OF THE PRIOR ART

In modern agriculture and horticulture, seed trays are widely employed in the production of plant seedlings. Before the advent of seed trays, seedlings were commonly germinated and raised in seed beds. The beds of soil had to be fumigated to protect the next generation of tender seedlings from pathogens. A popular fumigant used was methyl bromide. However, it was found that methyl bromide depletes the stratospheric ozone layer hence, its use as a soil fumigant is being phased out. The phasing out of methyl bromide was an important impetus to the increasing popularity of seed trays, as trays can be disinfected using chemicals other than methyl bromide.

Plant growth systems employing seed trays differ in the setup and materials used. The manner in which water and nutrients are supplied to the seeds or seedlings accounts for one major difference. In this aspect, there are three primary types of growth systems, namely: a) trays that are supplied water from overhead (e.g. overhead sprinkler system); b) trays that are placed on the floor of a pool, the water level of which is carefully monitored and controlled; and c) trays that are floatable in a pool of water. The last type of seed trays are used in certain countries, e.g. in the US and China, for the production of tobacco seedlings. At present, seed trays used in the float growth system are usually made of expanded polystyrene (EPS) that is commercially available under the trademark STYROFOAM®.

For consistent success in a floatation growth system, good sanitation is critical. Since EPS is somewhat porous in nature, achieving thorough disinfection is difficult and becomes increasingly so with age of the seed tray. Additionally, EPS trays are also prone to damage by seedling roots and the nesting activity of animals such as rodents and birds. Further, it is not economically viable to recycle EPS trays.

A floatable seedling tray that is made of hard plastic material rather than EPS has been disclosed in US publication no. 2008/0120903 A1.

The prior tray of this US publication basically resembles a substantially rectangular closed box comprising an upper seedling receptacle fused to a lower receptacle. The upper receptacle has a plurality of downwardly tapering cells for receiving growth media and seeds. The bottom of each cell of the upper receptacle is provided with a hole. The lower receptacle basically comprises a substantially flat tray with a plurality of holes. The upper and lower receptacles are fused together such that the hole at the bottom of each cell of the upper seedling receptacle is aligned to a corresponding hole on the lower receptacle.

In use, this prior tray is made floatable by air trapped in a single contiguous space (within the rectangular box) between the upper and lower receptacle units. Water enters the tray through the holes of the lower unit and is wicked into the media that fill the cells of the upper unit.

The above prior tray has been observed to have a number of disadvantages, in practice.

Firstly, assembly of this prior tray is unduly complex due to the need for precision fusing (welding) of the upper and lower units so that the bottom hole of each upper seedling unit cell is precisely aligned with the hole of the lower unit. Otherwise, water uptake within each cell could be compromised, possibly resulting in insufficient moistening of the media. This would in turn likely affect the growth rate of the seedling and in some cases either failure to germinate or death of the seedling.

Further, great care also needs to be taken when fusing the upper and lower units together so as to ensure that leakage at the fusion points does not occur, since this would affect buoyancy and ultimately, the stability of this prior tray configuration, in use.

Buoyancy of this prior tray is achieved by way of trapping of air within a single contiguous air chamber. This is not desirable since it increases the risk of failure of the tray when leakages occur at one or more of the above-mentioned fusion points of the upper and lower units.

The shape of the upper and lower units (upper receptacle having a plurality of tapered cells and lower flat receptacle) coupled with the need to fuse the upper and lower units together in manufacture, prior to transit, prohibits the upper and lower receptacles from being transported as separate units i.e. this, prior tray would need to be transported in its assembled state, a substantially rectangular closed box. This will lead to difficulties during transportation and storage (e.g. space constraints).

This invention thus aims to alleviate some or all of the problems of the prior art.

SUMMARY OF THE INVENTION

In accordance with the invention, a floatable plant growth system is provided. The system comprises an upper tray and a lower tray. The upper tray has a plurality of downwardly tapering cells for receiving plant growth material, with each of the plant cells having an opening at its bottom. The lower tray has a plurality of upwardly tapering cells that trap air, enabling the system to float in use. The upper tray is removably mateable with the lower tray such that the plant cells of the upper tray are located in the space between the air cells of the lower tray. The lower tray is provided with a plurality of openings. When the upper and lower trays are mated together and placed in a body of liquid, liquid enters the mated tray configuration through the openings of the lower tray, fills the space below the plant cells that is between the air cells of the lower tray, and in use may be taken up through the bottom opening of each upper tray plant cell.

In an embodiment, the upper tray may further comprise intercellular bridges disposed such that each bridge is seated on a lower tray air cell, when the upper and lower trays are mated together.

In another embodiment, the upwardly tapered air cells of the lower tray may have a different gradient relative to the downwardly tapered plant cells of the upper tray.

In a further embodiment, each plant cell may comprise a suitably shaped pocket with an open top.

In yet another embodiment, each plant cell of the upper tray may further comprise ridges on the internal surface of its tapered sides.

According to an embodiment, each air cell may comprise a suitably shaped pocket with a blind top end and an open bottom end.

According to another embodiment, the lower tray may further comprise a rib. The lower tray rib may be a hollow rib.

The rib may be provided about the perimeter of the lower tray. The perimeter rib may further comprise a plurality of portions of reduced height distributed along said rib.

In an embodiment, the upper and lower trays may be made of different materials and/or of materials of different properties. For example, the upper tray may be made of thinner or lower grade material than the lower tray.

In yet another embodiment, both the upper and lower trays may be made of plastic material.

The lower tray may be made of thick gauge virgin plastic material.

Both the upper and lower trays may be made of polystyrene.

Both the upper and lower trays may be made of polypropylene.

In another aspect, the invention provides a floatation tray for use in the above floatable plant growth system.

According to a further aspect of the invention, a floatation tray for use in the floatation of plant-holding structures in a body of liquid is provided. The tray comprises a plurality of upwardly tapering cells that trap air and a plurality of openings. The air cells enable the tray to float when in use and the space between the air cells allows for the support of the plant-holding structures. In use, liquid enters the tray through the openings, and fills the space between the air cells of the tray to a pre-determined depth.

In an embodiment of this aspect, the floatation tray may further comprise a rib. The rib may be a hollow rib. The rib may be provided about the perimeter of the floatation tray.

It is an object of this invention to provide a floatation plant growth system and a floatation tray for use with the system that overcomes the above-mentioned problems of the prior art.

It is also an object of this invention to provide a floatation tray for use in the floatation of plant-holding structures in a body of liquid.

Due to its shape, the floatation plant growth system as well as the floatation tray is economical and simple to manufacture and assemble.

The floatation plant growth system of this invention comprises a pair of upper seedling tray and lower floatation tray that correspond in shape and configuration i.e. upper tray having downwardly tapering cells that mate with lower tray having upwardly tapering cells. This configuration coupled with the fact that the upper and lower trays are conceived to be removably mateable allows for the floatation plant growth system to be transported unassembled i.e. upper and lower trays transported as separate nestable units (upper tray units transported nested with each other and lower tray units transported nested with each other), thus facilitating transportation and storage of the trays.

Further, the upper and lower trays are easily and quickly separable as the trays are not affixed (or fused) together during assembly or use, thereby lending greater flexibility to assembly of the system and also allowing the system to be easily adaptable to existing equipment (e.g. tray filling machines, seeders, clippers), and structures (e.g. glasshouse, pools) with little or no modification.

The floatation plant growth system may easily be adaptable to crops that require a differing amount of water or liquid nutrient. The immersion depth of plant cells of the upper plant tray, whether empty or when loaded with plant material, is easily adjustable by adjusting the buoyancy of the lower floatation tray. This can be done by perforating the top ends of selected air cells (and/or the top surface of the structural rib) of the floatation tray.

For example, for greater immersion depth, a number of air cells (and/or selected top surface portion(s) of the structural rib) may be perforated so that buoyancy of the floatation tray is decreased, allowing the floatation tray to be immersed to a greater depth. This in turn would lead to water or liquid filling the space between the air cells to a higher level, hence, allowing the bottom ends of the downwardly tapered plant cells of the upper tray located between the air cells to be immersed to a greater depth. Alternatively, if a lesser immersion depth is required, then the upper plant tray may simply be removed from the original lower floatation tray and mated with a floatation tray having higher buoyancy (e.g. non-perforated air cells or air cells of a larger dimension).

In the floatation plant growth system of this invention, providing for a differing gradient for both the tapered plant and air cells of the upper and lower tray facilitates easy and quick separation of the trays i.e. the upper tray, even when loaded with growth media and plant material (e.g. seeds, seedlings, plants), is easily and quickly separable (liftable) from the lower tray, without damage to the trays or content of the plant cells.

Providing intercellular bridges in the upper tray that sit on top of the air cells of the lower tray, in use, ensures that the plant growth material filled into the plant cells is kept constantly moist whilst preventing the media (seedling or plant root system) within the plant cells from being over-saturated (drowned) by the water or liquid i.e. only the bottom tip of the plant cell contacts the water or liquid filling the space between the air cells of the floatation tray.

Due to its shape and configuration (tray with plurality of upwardly tapering cells), the lower floatation tray may itself be potentially used as a plant tray with little or no modification e.g. growth media, seeds and/or plants could possibly be filled into the air cells, when the floatation tray is used in an inverse orientation.

As opposed to a chamber for trapping air inside a "closed box" configuration of the prior tray described above, buoyancy in the floatation plant growth system of this invention is accorded by the trapping of air within the upwardly tapered air cells, underneath the lower floatation tray.

Having a plurality of air cells as opposed to a single contiguous air chamber allows the floatation tray of this invention to have an increased resistance to failure due to leaks. For example, even if one or a few of the air cells are damaged, buoyancy of the floatation tray is only reduced by a small portion and the tray remains usable. By trapping air in this manner, the floatation tray also accords a greater (horizontal) stability to the floatation plant growth system when used therewith and also to any plant-holding structure supported thereon.

Providing a rib, and preferably a perimeter rib, aids in preventing the flotation tray from being prone to warping, hence further increasing its structural integrity. Additionally, preferably having the openings for water or liquid entry distributed about the perimeter of the floatation tray aids in enhancing horizontal stability of the tray in use (allows for even weight distribution of the water or liquid about the tray).

It is advantageous that either or both the upper seedling tray and lower floatation tray of this invention are made of a suitable plastic material, and particularly of a hard plastic material (e.g. polystyrene or polypropylene), as opposed to EPS. This allows for the trays (and the plant growth system) to be more durable and resistant to wear and tear as well as being easy to clean and sterilize. As it is not possible for the root system of seedlings to penetrate into hard plastic material, extraction of the plants/seedlings from the plant cells of the upper tray, is facilitated, thus reducing the risk of injury or occurrence of transplant shock to the plants/seedlings.

In the floatable plant growth system of this invention, the upper plant tray is supported by the lower floatation tray over almost its entire surface area. In addition to significantly enhanced stability of the system in use, this also allows for substantial reduction in material cost for the production of the upper plant trays as they may be made of a thinner or lower quality (plastic) material. This would be particularly advantageous in the case of single use plant trays.

The lower floatation tray in the plant growth system of this invention is also likely to be more durable (even without the use of material having ultraviolet protection), since it is naturally protected from the weathering effects of ultraviolet light by the plant tray nested above it.

BRIEF DESCRIPTION OF THE DRAWINGS

The invention is illustrated, although not limited, by the following description of embodiments made with reference to the accompanying drawings in which.

DETAILED DESCRIPTION OF THE EMBODIMENTS

FIGS. 1, 2, 5 to 7, 10 and 11 show a preferred embodiment of a floatable plant growth system and a floatation tray according to the present invention.

The floatable plant growth system comprises an upper plant tray 10 and a lower floatation tray 20. The lower tray 20 may be used with the plant growth system or separately as a floatation tray for supporting various plant-holding structures in a body of liquid.

In FIGS. 1 and 3 to 12, the upper plant tray 10 and lower floatation tray 20 are separately shown, prior to assembly.

Figure 10:
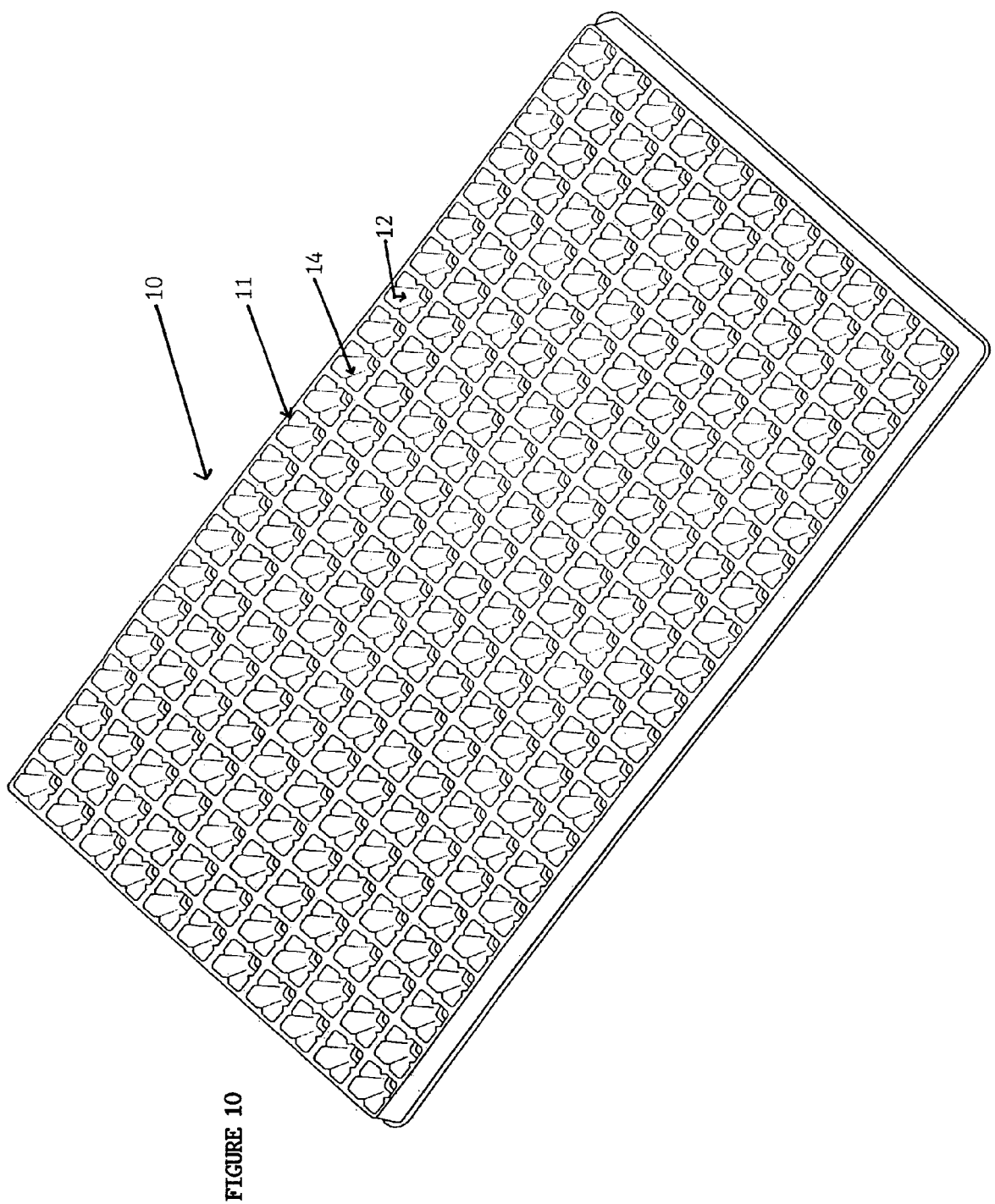
FIG. 10 is a top perspective view of the upper tray of FIG. 1.
Figure 12:
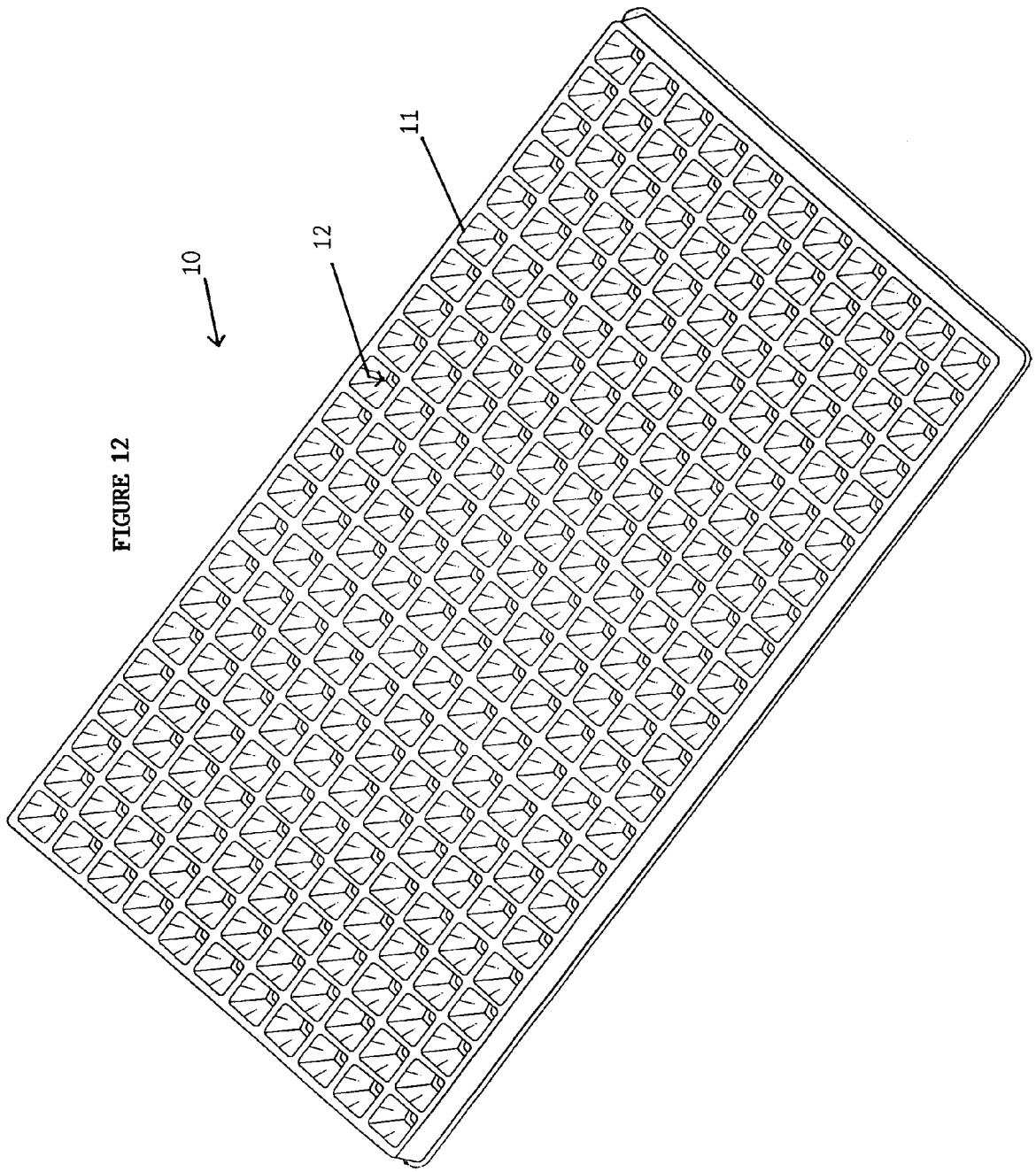
FIG. 12 is a top perspective view of another embodiment of the upper tray.
Figure 13:
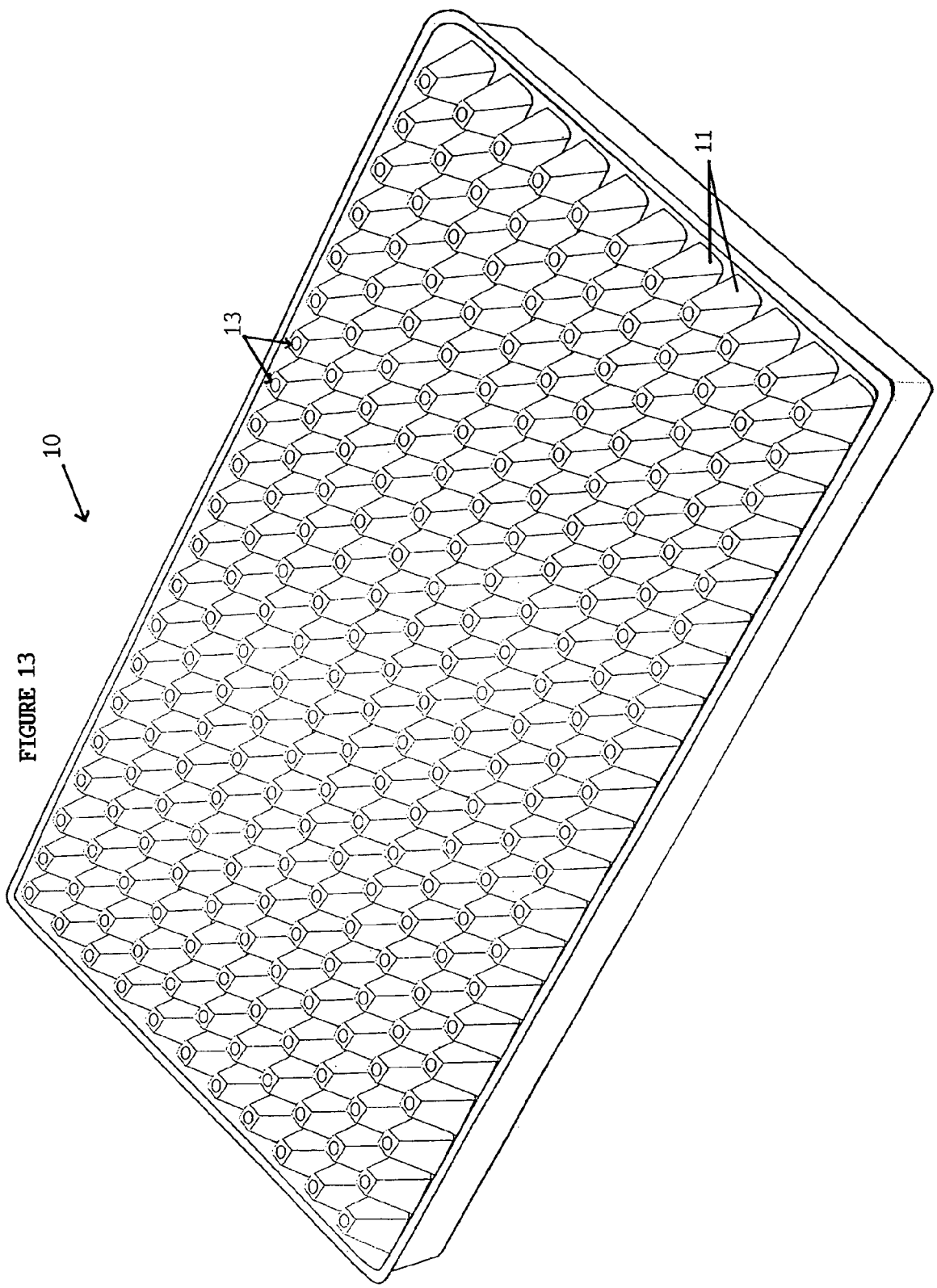
FIG. 13 is a bottom perspective view of the upper tray of FIG. 12.

As seen in FIGS. 10, 12 and 13, the upper plant tray 10 is preferably rectangular in shape. However, the upper tray 10 may also be provided in any other suitable shape depending on the requirements of the plants or seedlings to be germinated and the shape and size of the water (or liquid) pool in which the plant growth system is to be suspended.

The upper tray 10 is provided with a plurality of downwardly tapering cells 11 of a sufficient depth for receiving plant growth material (e.g. seeds, seedlings or plants and growth media). Preferably, each of the plant cells 11 is substantially in the form of a square shaped pocket with an open top 12. The cells are integral to the tray. Again, the shape and size of the plant cells 11 may be varied depending on plants or seedlings to be grown therein. Each plant cell 11 is provided with a suitably sized opening 13 at its bottom for the uptake of water (or liquid nutrient), as shown in FIG. 13.

Figure 2:
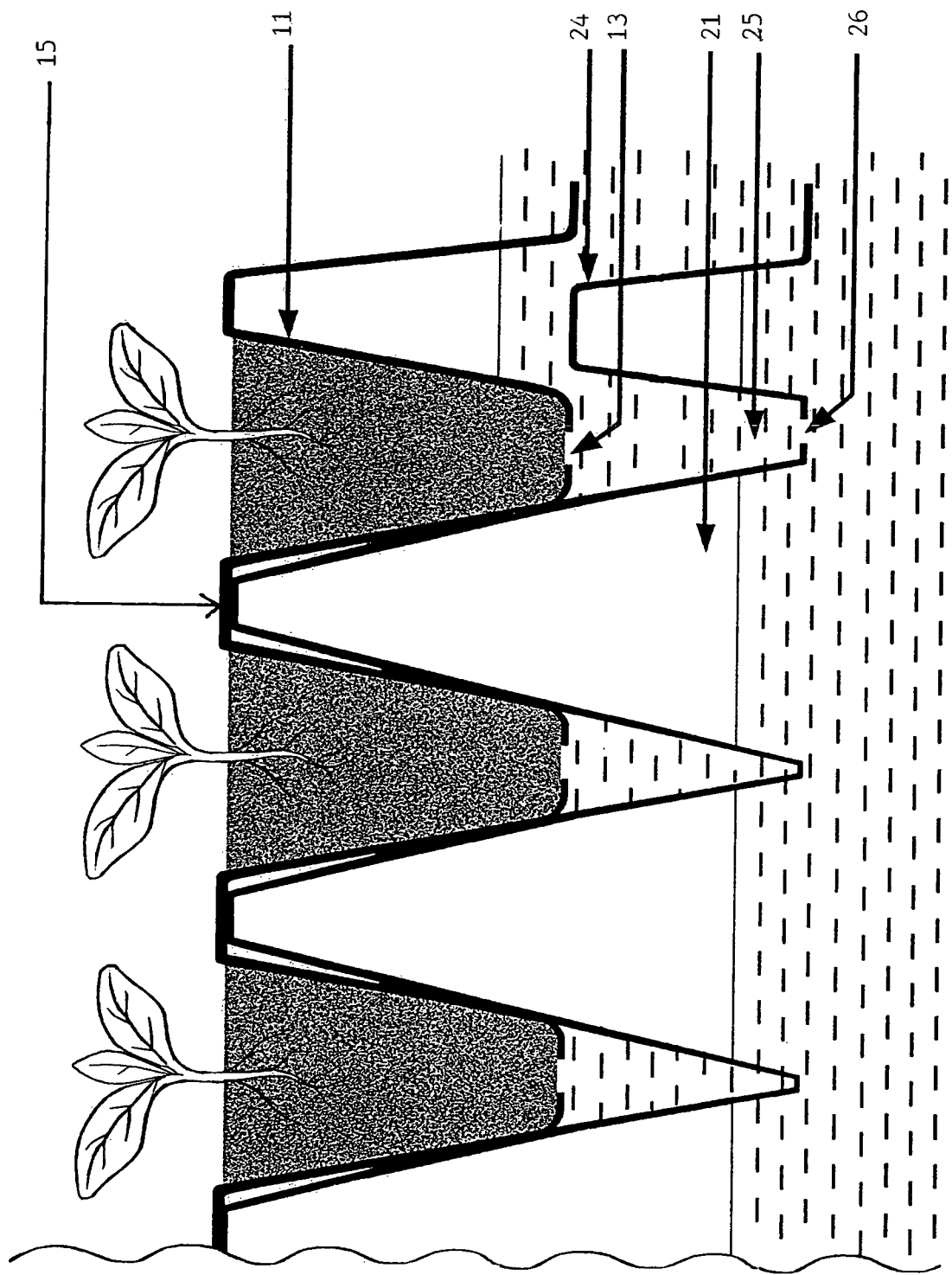
FIG. 2 is a vertical cross sectional view of the assembled system (upper tray nested on lower tray) of FIG. 1, afloat on a body of liquid.

In a preferred embodiment, a bridge 15 between each plant cell 11 of the upper plant tray 10 is provided. These intercellular bridges 15 are located such that they sit on top of the air cells 21 of the lower floatation tray 20 when the upper and lower trays 10, 20 are mated together, in use (FIG. 2). The purpose of these intercellular bridges 15 will be discussed below.

Figures 11A, 11B:
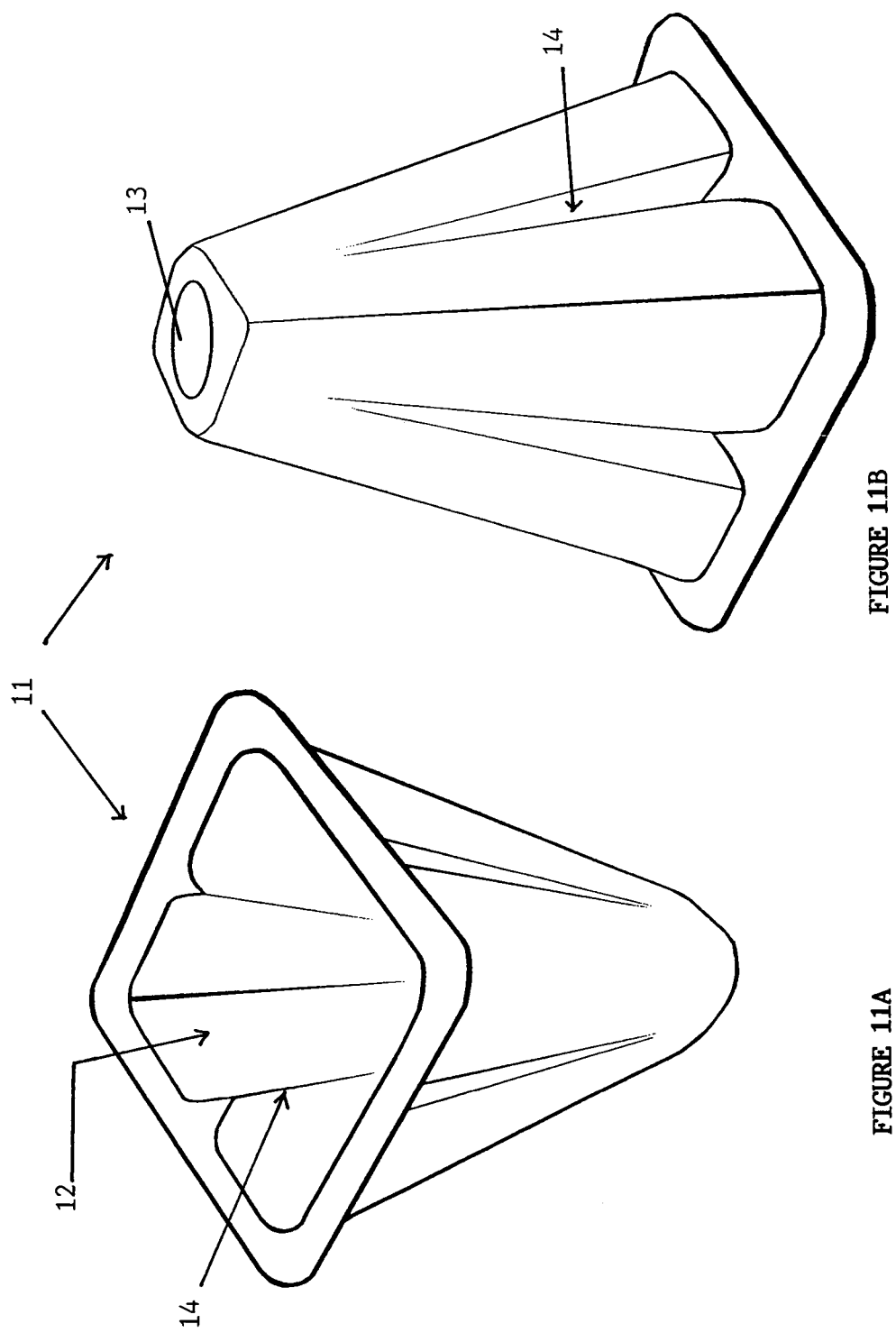
FIGS. 11A and 11B show top and bottom perspective view, respectively, of a seed cell of the upper tray of FIG. 10.

Although not essential, as shown in FIGS. 10, 11A and 11B, the internal surface of each downwardly tapered plant cell wall is preferably provided with a ridge 14 that spans the height of the cell 11. This vertical ridge 14 aids in promoting the downward growth of the plant or seedling roots. Without the vertical ridges 14, plant or seedling roots tend to naturally spiral about the walls of the plant cell 11 rather than grow downwards, and this would have a detrimental effect on the subsequent growth of the plant or seedling.

As with the upper plant tray 10 described above, the lower floatation tray 20 is also preferably rectangular in shape (seen in FIGS. 3 to 8). Again, the lower tray 20 may also be provided in any other suitable shape and configuration depending on whether it is being used with the presently described floatation plant growth system or as a floatation tray for a plant-holding structure suspended in a body of liquid, e.g. in a hydroponic system, in a phytoremediation system of a polluted body of water, for landscaping purposes etc. The perimeter dimensions of the lower tray 20 may be identical, larger or smaller than the upper plant tray 10 (or the plant-holding structure which it is keeping afloat).

Figure 1:
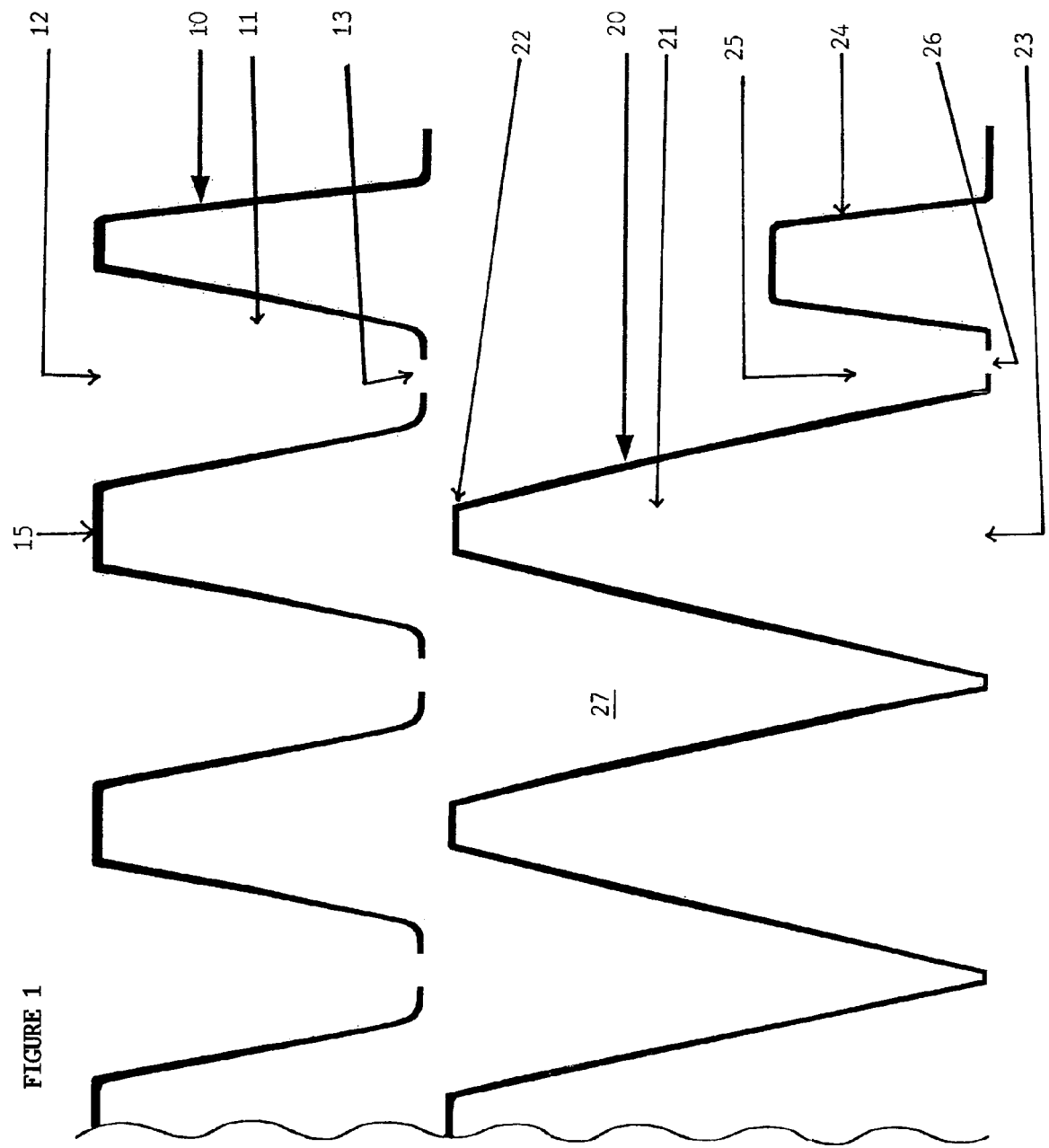
FIG. 1 is a vertical cross sectional view of a portion of the upper and lower trays, prior to assembly of the system.
Figure 3:
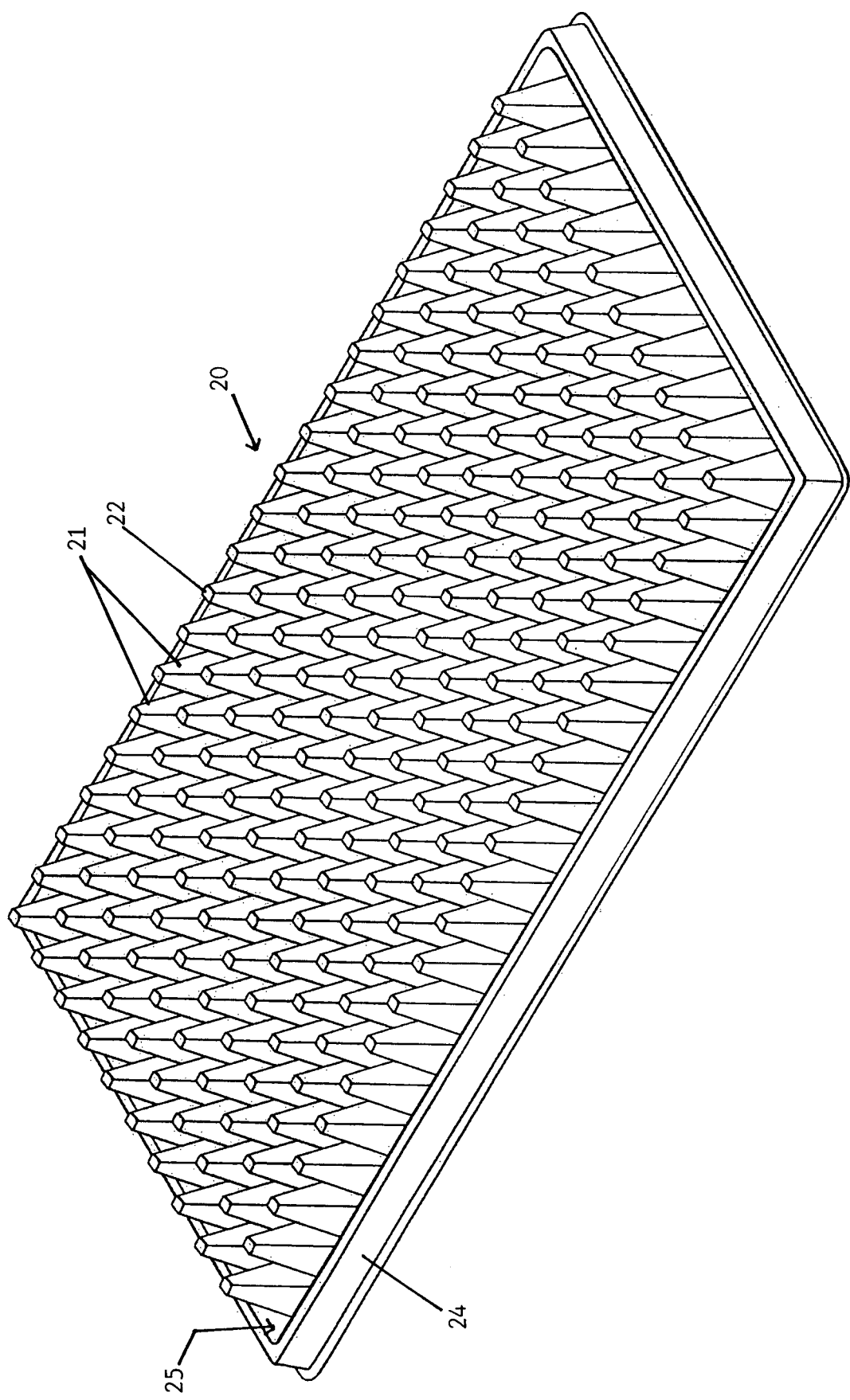
FIG. 3 is a top perspective view of the lower tray of FIG. 1.
Figure 4:
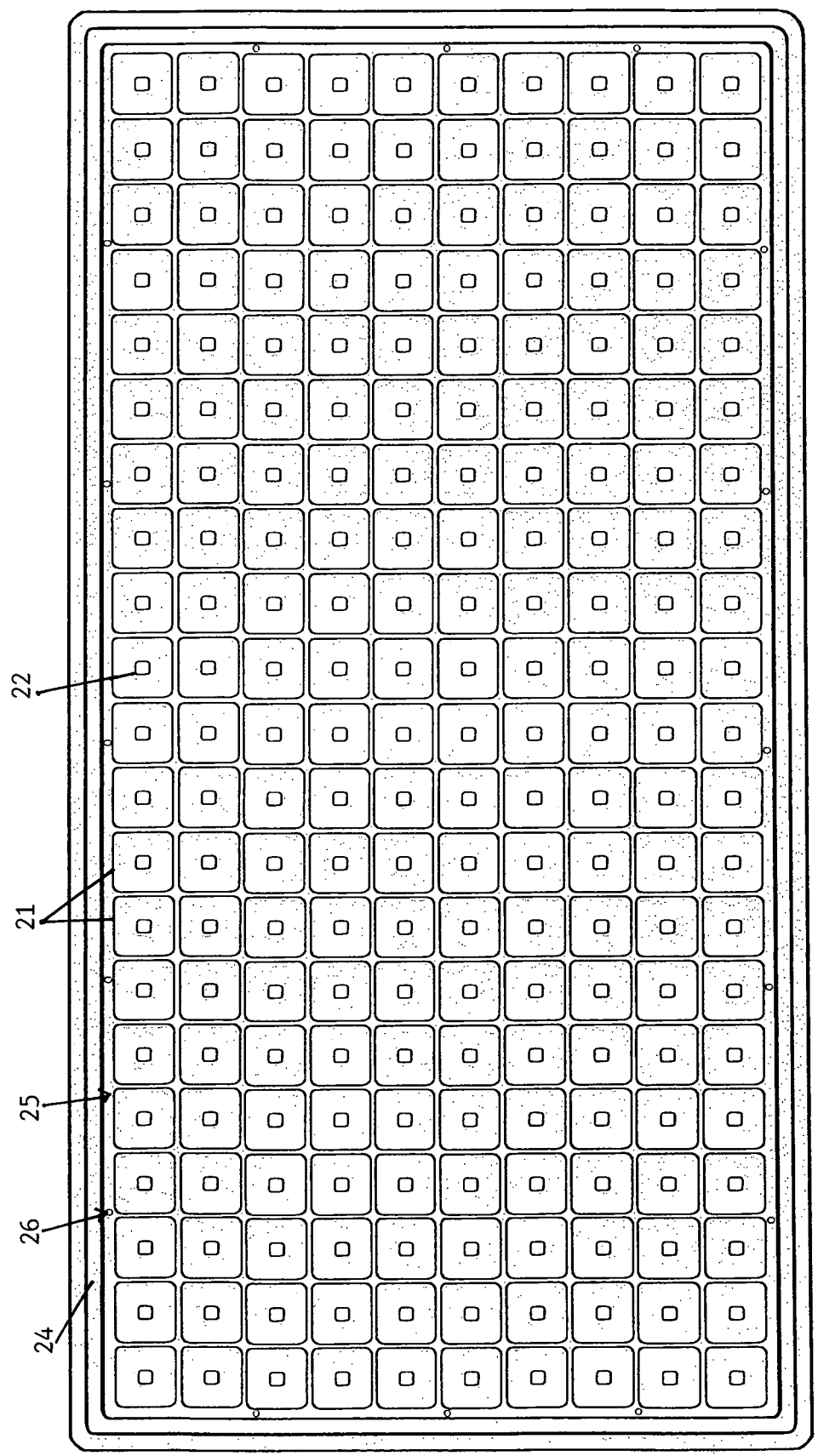
FIG. 4 is a top view of the lower tray of FIG. 3.
Figure 5:
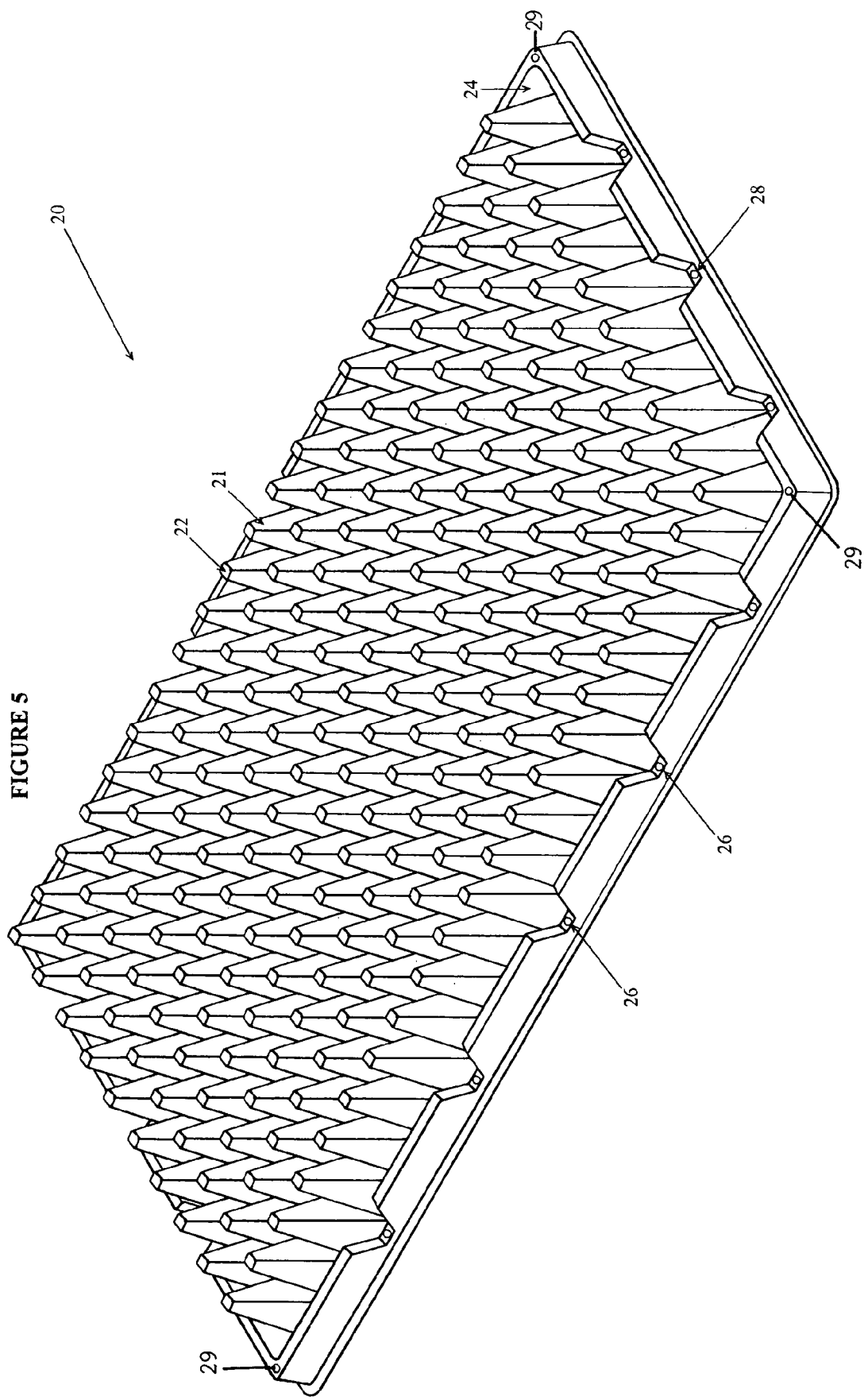
FIG. 5 is a top perspective view of another embodiment of the lower tray.
Figure 9B:
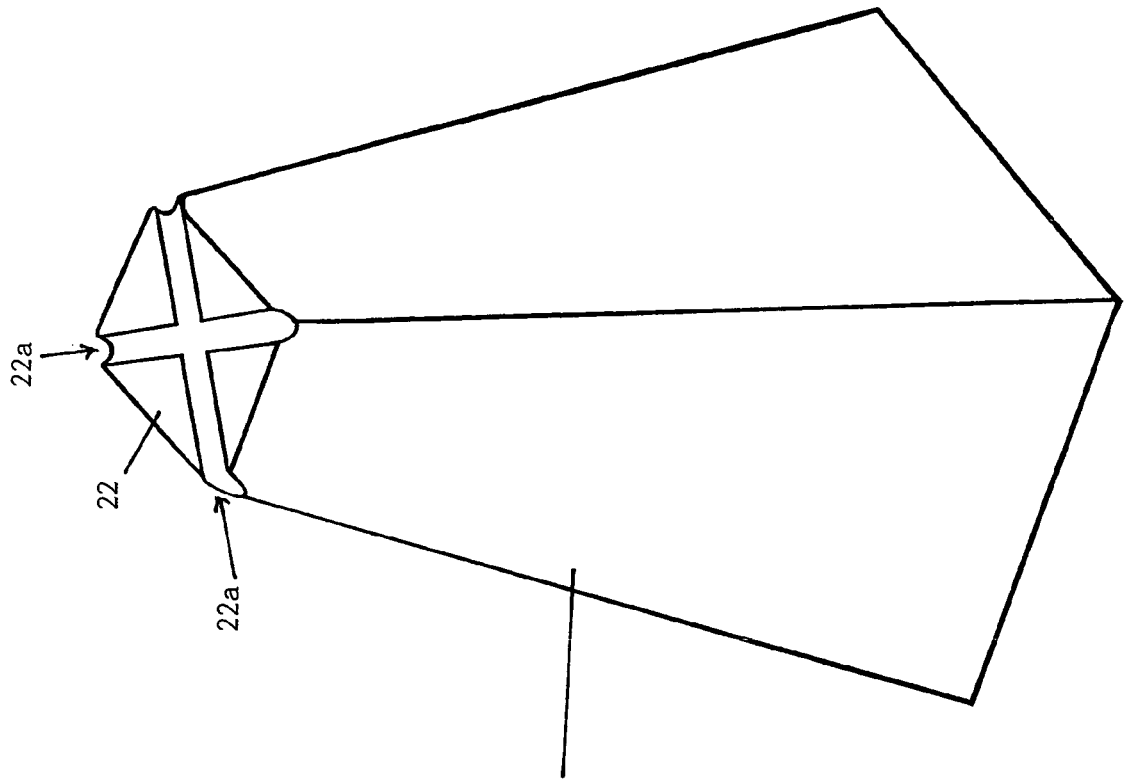
FIGS. 9A and 9B are top perspective views of two embodiments of an air cell of the lower tray.
Figure 9A:
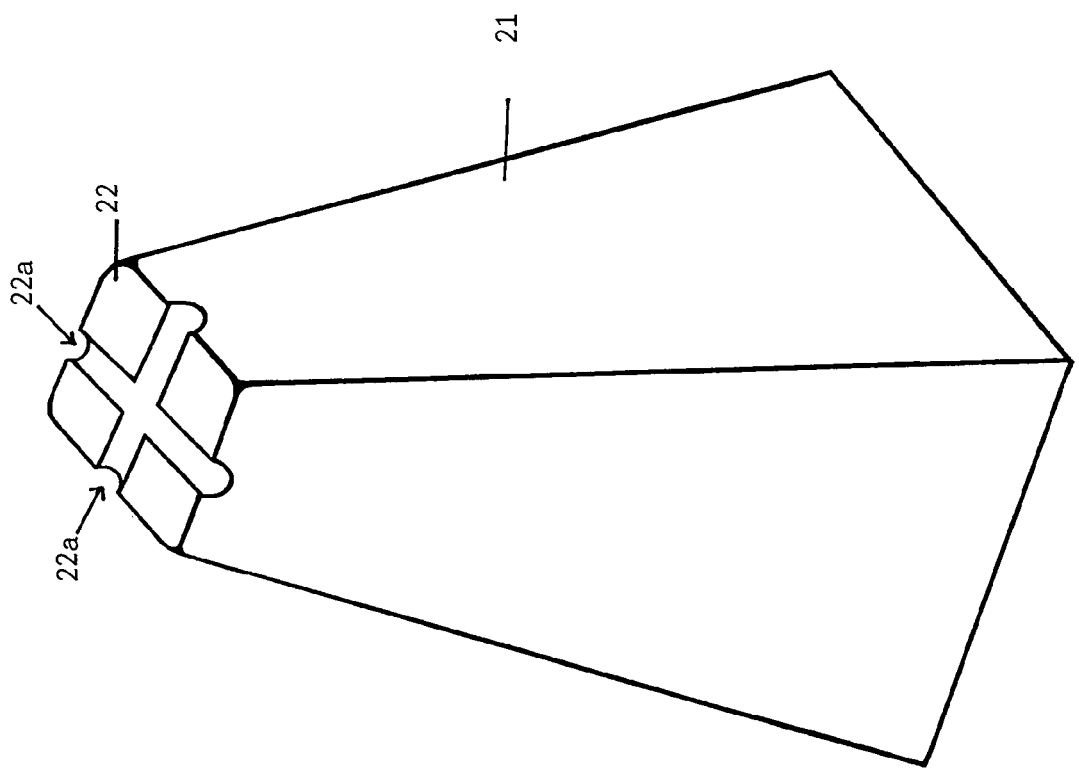

As best seen in FIGS. 1, 3 and 5, the lower floatation tray 20 is provided with a plurality of upwardly tapering cells 21 that trap air enabling the tray 20 to float in use. Each air cell 21 of the floatation tray 20 is substantially in the form of a square shaped pocket with a blind top end 22 and an open bottom end 23. The blind ends 22 of the air cells 21 may be provided with depressed channels 22a, as illustrated in FIGS. 9A and 9B. The function of these channels 22a will be explained in the paragraph below.

The air cells 21 are integral with the floatation tray 20. Hence, when the floatation tray 20 is placed in a water pool or a body of liquid, it functions as a floatation or buoyancy aid for any structure placed on it e.g. a plant/seedling tray, plant platform etc. If desired, buoyancy of the floatation tray 20 can be reduced by perforating selected air cells 21 at the top or blind ends 22 of the cells. As mentioned above, when the lower floatation tray 20 is mated with an upper tray 10 in use, the intercellular bridges 15 of the upper tray 10 sit on the blind ends 22 of the air cells 21. In the case of a floatation tray 20 having a selection of its air cells 21 perforated, provision of depressed channels 22a on the blind ends 22 are needed in order to allow for escape of air.

The dimension, shape and configuration of the lower tray air cells 21 may be variable depending on various factors e.g. the shape of the plant cells 11 of the upper tray 10, the required immersion depth of the plant cells 11 (upper tray 10) in the water (or liquid nutrient) pool, which is dependent on the type of plants to be grown or seeds to be germinated etc. By way of example of a different configuration, in addition to being distributed in rows and columns as illustrated in FIGS. 3 to 8, the air cells 21 may also be distributed in a circular or crescent shape about the surface of the tray 20.

The lower floatation tray 20 is also provided with a rib 24 (or a plurality of ribs) that aids in preventing the tray 20 from warping i.e. the rib 24 increases structural integrity of the floatation tray 20. Preferably, the rib 24 is a hollow rib. Even more preferably, the rib 24 is provided at the perimeter of the tray 20 (best seen in FIGS. 3 and 5). In this preferred embodiment, a channel 25 is defined between the rib 24 and the row of air cells 21 adjacent the perimeter of the tray 20 (best seen in FIGS. 4, 6 and 8). When provided at the perimeter of the tray 20, rib 24 is preferably provided with intermittent portions 28 of reduced height distributed along its length (FIGS. 5 to 8). These intermittent reduced height portions 28 may comprise substantially wedge-shaped valleys that reduce the height of the rib 24 by more than half. The reduced height portions 28 allow water or liquid to flow quickly over the rib 24 and onto the lower floatation tray 20.

Figure 6:
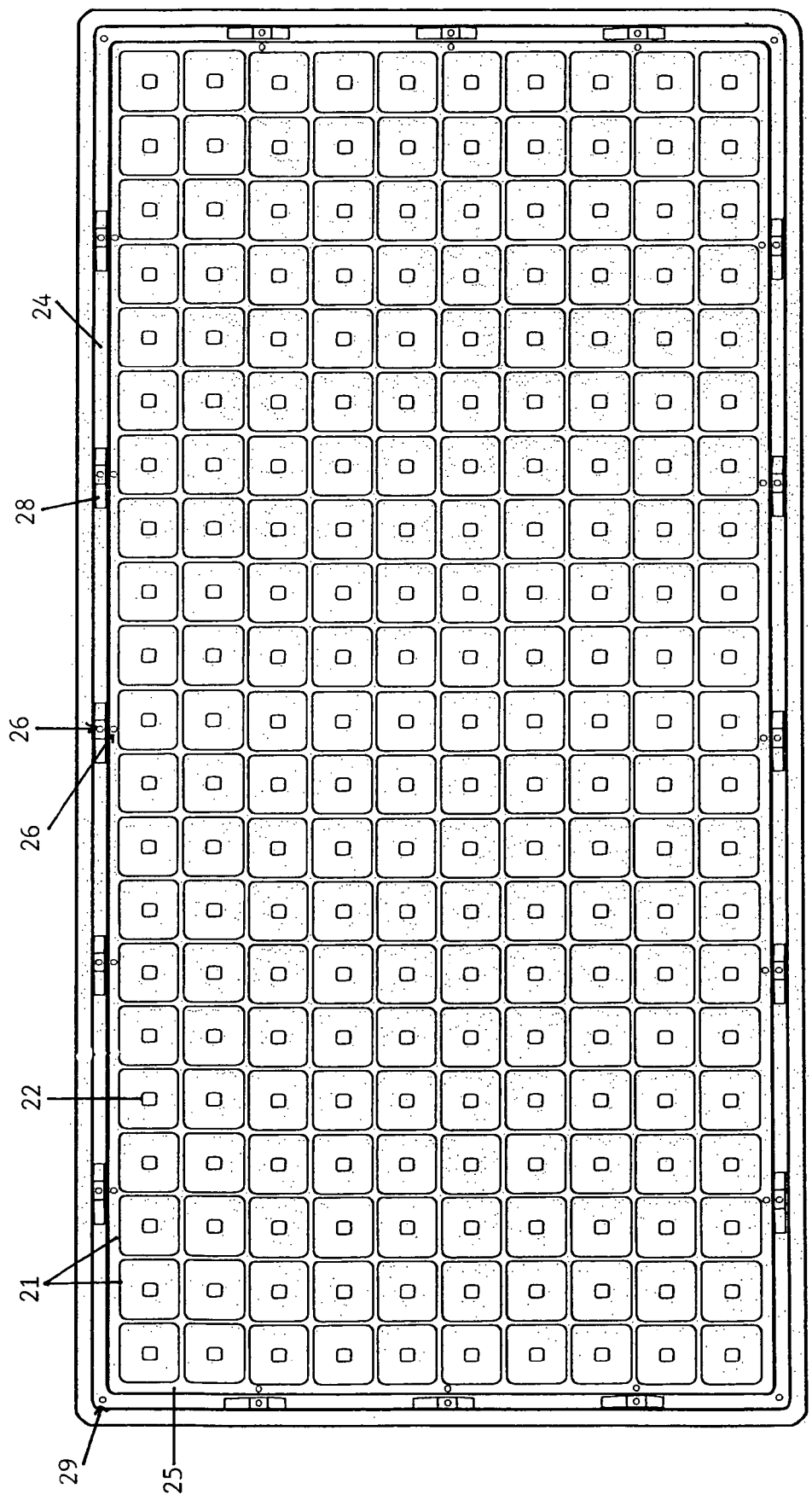
FIG. 6 is a top view of the lower tray of the embodiment of FIG. 5.
Figure 7:
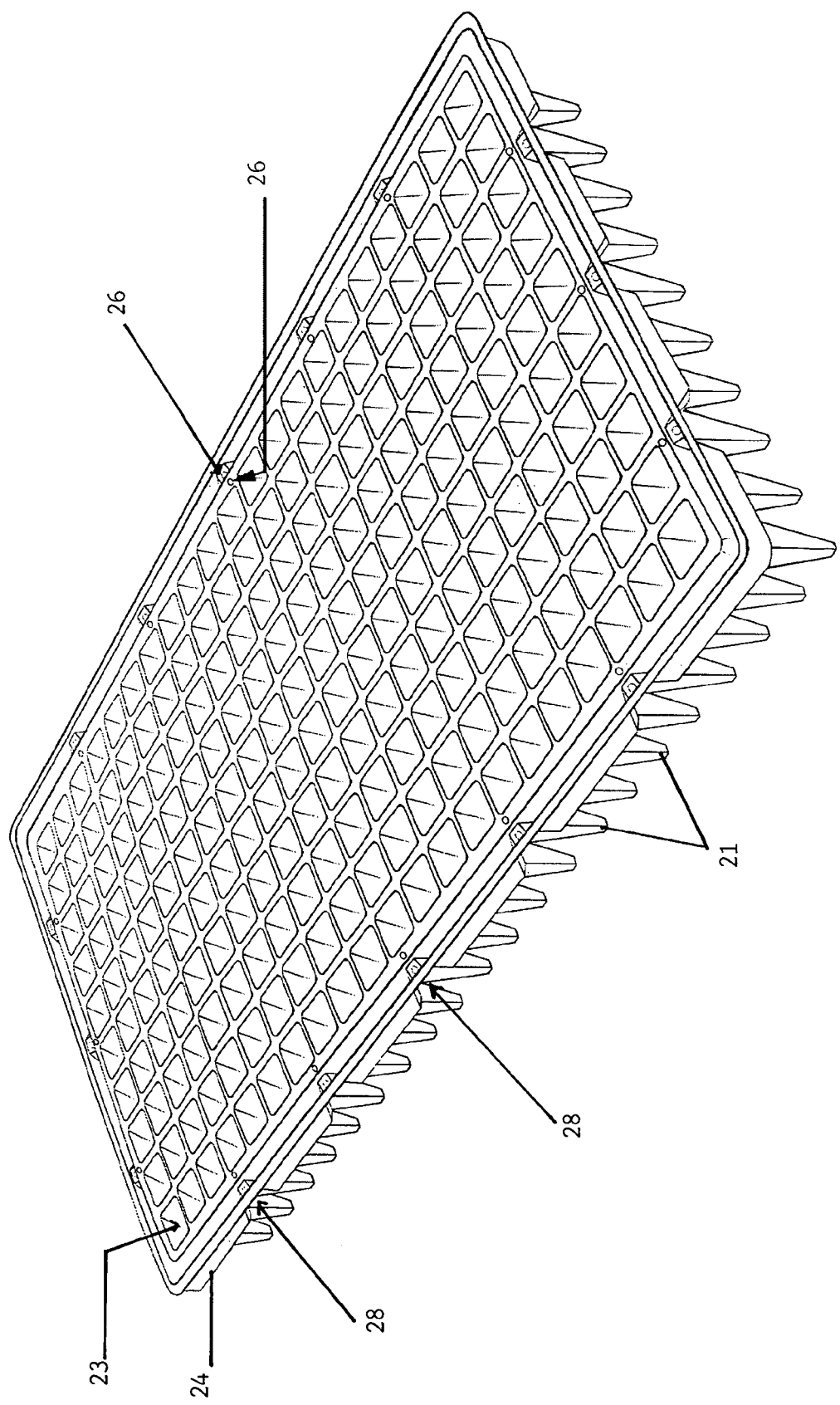
FIG. 7 is a bottom perspective view of the lower tray of FIG. 5.
Figure 8:
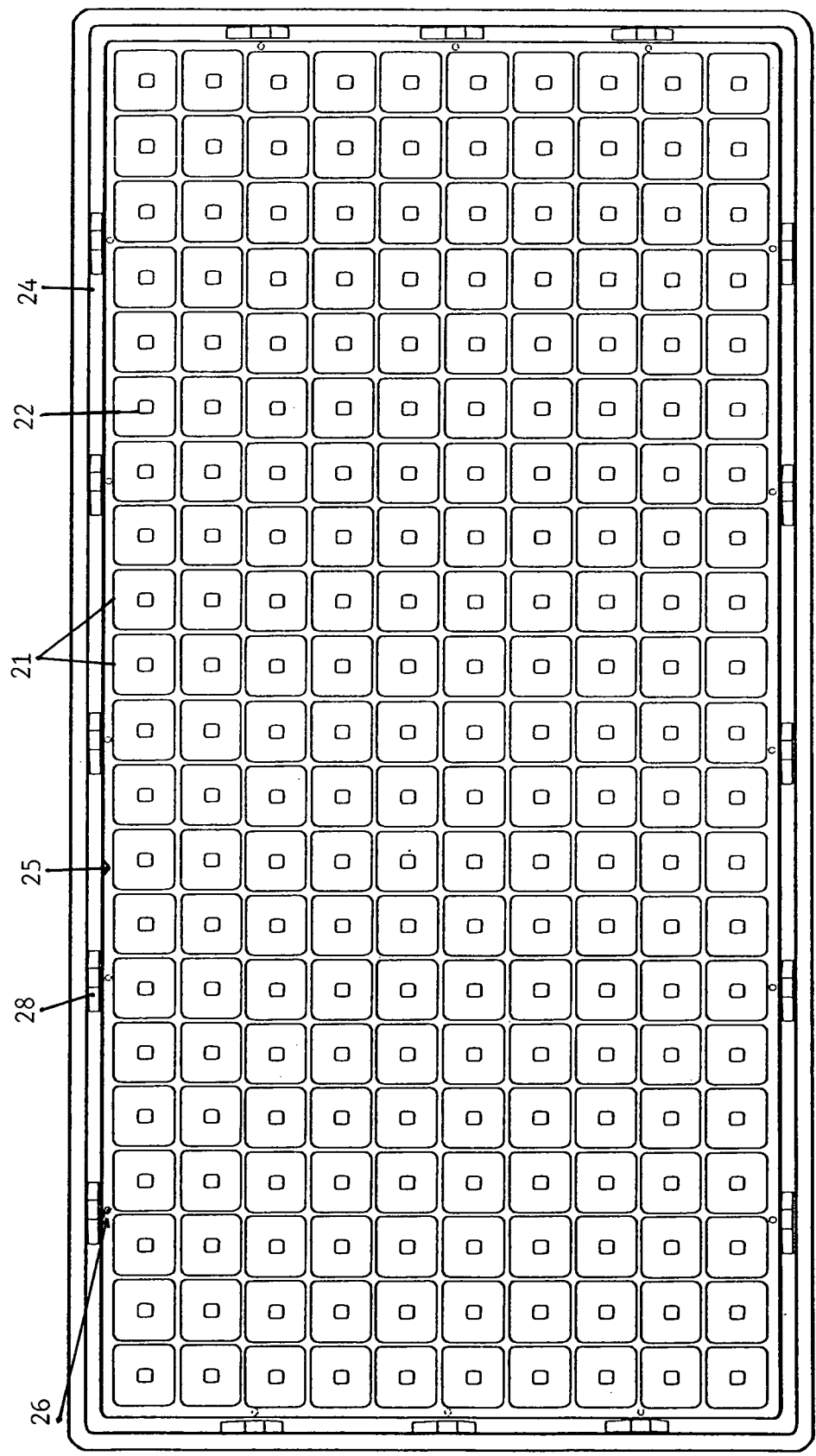
FIG. 8 is a top view of yet another embodiment of the lower tray.

Buoyancy of the floatation tray 20 can also be reduced by selectively perforating any portion of the top surface of rib 24. For example, FIGS. 5 and 6 show a floatation tray 20 having a perimeter rib 24 with four corner perforations 29.

Although not illustrated herein, the lower tray 20 may also be provided with one or more structural ribs 24 traversing the width and/or length of the tray. Preferably, these ribs 24 are also provided with a plurality of reduced height portions 28 along its length.

A plurality of openings 26 is provided at predetermined locations on the floor of the lower tray 20, for ingress and egress of water or liquid nutrient into the tray 20. In the above-described preferred embodiment where a perimeter rib 24 is provided, the openings 26 may be provided on the floor of the channel 25 adjacent the perimeter rib 24 such that they are evenly distributed around the perimeter of the lower tray 20 as this would contribute to the horizontal stability of the tray, in use.

Further, for the preferred embodiment (FIGS. 5 to 7) of the floatation tray 20 having a perimeter rib 24 with intermittent portions 28 of reduced height, an opening 26 may also be provided on the top of each reduced height portion 28. Such openings 26 provided on the reduced height portions 28 of the rib 24 further aids in quick flow of water or liquid onto the tray 20, thus expediting immersion of the floatation tray 20 (and upper seedling tray 10 mated to the floatation tray 20) to the desired depth in the water or liquid. Quick immersion of the floatation tray 20 is particularly advantageous when the tray is used in the floatation plant growth system as this will minimize the risk of "dry plant cells" occurring due to the plant growth material in the plant cells 11 drying out as the bottom tip of the plant cells are not dipped (or immersed) into water or liquid soon enough.

As seen in FIG. 2, the upper plant tray 10, its cells 11 filled with plant growth material, is mated with the lower floatation tray 20 and is floating on the surface of the water (or liquid nutrient), immersed to a pre-determined depth. The upper and lower trays 10, 20 are preferably held together largely by gravity i.e. the weight of the upper tray 10 and its contents (plants/seeds/seedlings and growth media) resting on the lower tray 20. The upward buoyancy force accorded by air trapped within the air. cells 21, underneath the tray 20, also contributes to hold the upper and lower trays 10, 20 together.

The downwardly tapering plant cells 11 are located and fit snugly in the space 27 between the upwardly tapering air cells 21 (intercellular space) of the lower floatation tray 20 such that horizontal movement of the upper plant tray 10 when mated with the floatation tray 20 is prevented, although, the upper and lower trays 10, 20 are easily and quickly separable i.e. the upper and lower trays 10, 20 are removably mateable. This configuration also renders the floatable plant growth system (upper and lower trays 10, 20 mated together) structurally strong such that it is resistant to central subsidence even after a lengthy period afloat in a body of liquid, in use.

When the floatation plant growth system is in use, firstly, the upper plant tray 10 is filled with plant growth material. The filled (or loaded) upper tray 10 is then mated with a lower floatation tray 20 by fitting the upper tray 10 over the lower tray 20.

Figure 14:
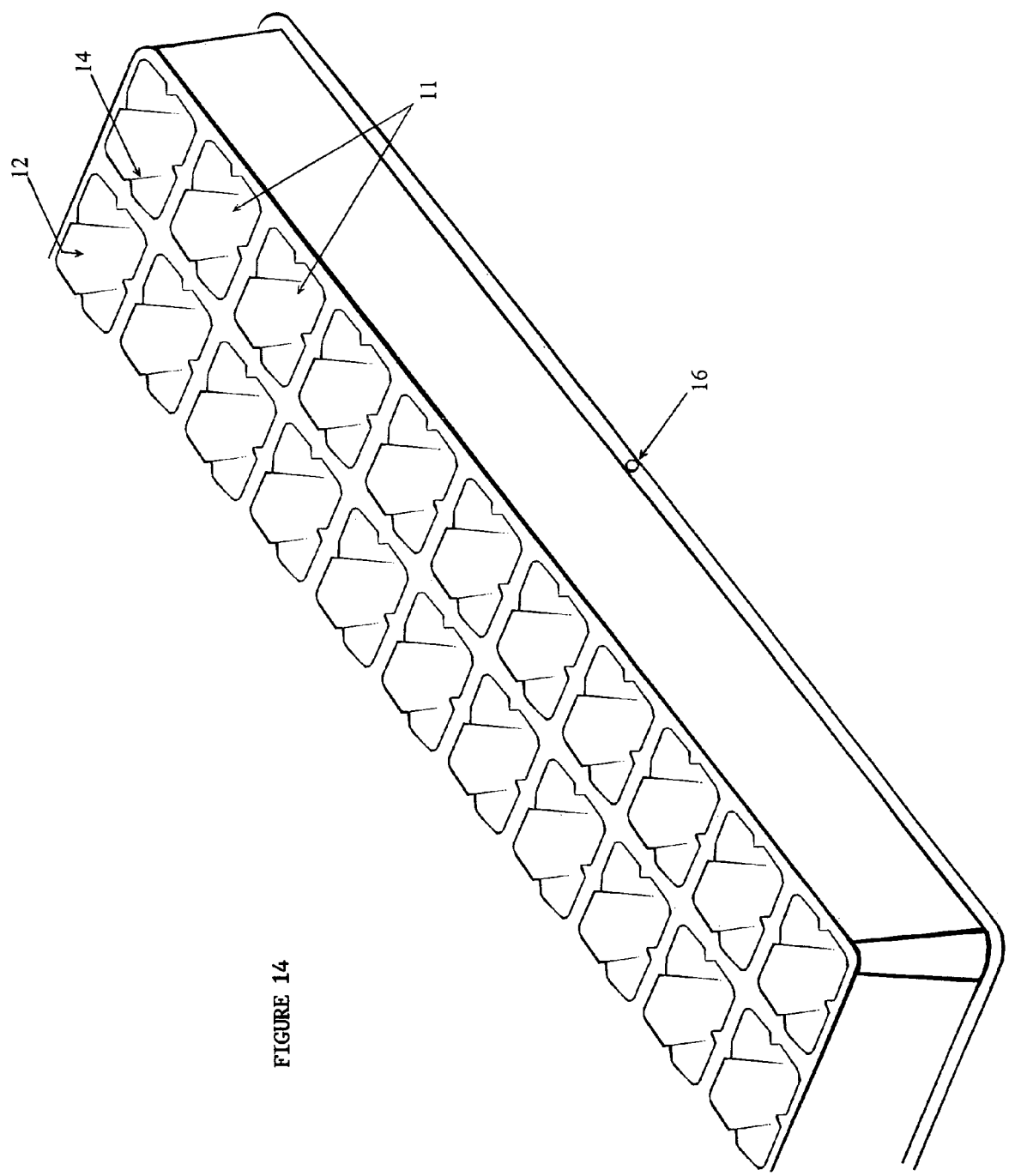
FIG. 14 is a close-up view of one of the shorter sides of a rectangular-shaped upper tray having alignment means.

Alignment means such as dimples or protuberances may be provided on one or more sides of the upper tray 10 to enable tactile alignment (user friendly alignment by touch) of the trays 10, 20. For example, as seen in FIG. 14, when the upper tray 10 is rectangular in shape, alignment means may be provided on each of the shorter sides of the tray 10. In this embodiment, the alignment means provided are in the form of rounded protuberances 16 located mid-length on the shorter side of the tray 10.

The mated trays 10, 20 are then lowered into a water pool (or body of liquid). Water or liquid nutrient rapidly enters the nested tray configuration 10, 20 through the openings 26 of the lower floatation tray 20 and fills the space 27, below the plant cells 11, between the air cells 21 of the lower tray 20. The water or liquid nutrient is then taken up (or wicked) through the bottom opening 13 of each plant cell 11, rising through the growth media by way of capillary action.

When the upper and lower trays 10, 20 are mated together, the intercellular bridges 15 of the upper tray 10 sit on the top end 22 of the air cells 21. The configuration of the intercellular bridges 15 seated on the top end 22 of the air cells 21, allow for only the bottom tip of the plant cells 11 to be immersed to a pre-determined depth throughout the entire period the floatation plant growth system is in use i.e. the plant growth material in each plant cell 11 of the upper tray 10 is always in contact with the water or liquid but is never immersed so deep as to drown the root system of the plant or seedling.

Although not illustrated herein, the immersion depth of the plant cells 11 (upper tray 10) may generally be varied by increasing the height of the floatation tray air cells 21 depending on the type of plants or seedlings being grown (i.e. the general length of the root system for the duration of plant or seedling growth on the upper tray 10). Alternatively, an upper tray having plant cells of a greater depth may also be used.

Preferably, the gradient of the downwardly tapered plant cell wall 11 differs from that of the upwardly tapered air cell wall 21. For example, as seen in FIG. 2, the downwardly tapering walls of each plant cell 11 may have a steeper gradient relative to the upwardly tapering walls of the air cells 21. The difference in gradient between the plant cells 11 and the air cells 21 facilitates easy and quick separation of the upper plant tray 10 from the lower floatation tray 20. Even when fully loaded, the upper tray 10 may be easily lifted up from the lower tray 20. Generally, a water film has been observed to form between the contact surfaces of the plant and air cells 11, 21. This water film causes the contact surfaces of the plant and air cells 11, 21 to be tightly held ("bonded") together. Hence, if both the tapered plant and air cells 11, 21 have an identical gradient, a significant amount of force will be needed to separate the upper tray 10 from the lower tray 20. This can lead to damage to the trays 10, 20 as well as to the plants/seedlings within the plant cells 11.

It is preferable for both the upper plant tray 10 and lower floatation tray 20 to be made of a suitable plastic material, with polystyrene or polypropylene being particularly preferred.

The upper and lower trays 10, 20 may also be made of different materials and/or materials of different properties.

For example, the upper tray 10 may be made of a thinner plastic material and the lower tray 20 of a thicker more durable plastic material. This is made feasible due to the structurally strong configuration of upper tray plant cells 11 located between lower tray air cells 21, when the upper and lower trays 10, 20 are mated together. The upper tray 10 is less subject to wear and tear as it is supported by the lower tray 20, in use, hence allowing for the upper tray 10 to be made of thinner material without affecting performance of the trays 10, 20 (or system). This advantage is particularly important in the manufacture of single use plant/seed trays (upper tray 10). Multiple use lower floatation trays 20 may be made of a more durable material such as thick gauge virgin plastic material. The higher initial cost of this approach will be more than compensated by the reduced amortized cost.

The lower floatation tray 20 shown in FIG. 5 was designed specifically for use with an upper plant tray 10 having two hundred forty two plant cells 11 as seen in FIG. 10. Obviously, as mentioned above, the upper and lower trays 10, 20 may be of various dimensions and gross weight, hence, may comprise various configuration and number of plant and air cells 11, 21. For example, the substantially rectangular upper plant tray 10 and lower floatation tray 20 of a preferred embodiment as seen in FIGS. 10 and 5, respectively, measure 680 mm by 350 mm. The "square-top" plant cells 11 of the upper plant tray 10 of FIG. 9 measures 23.6 mm by 23.6 mm and has a height of 33.2 mm.

As compared with the floatable growth tray of US 2008/0120903 A1, it will be noted that the trays 10, 20 of the present embodiment are held together by the weight of the upper tray 10 resting on the lower tray 20 rather than being permanently fixed together; air is trapped within the air cells, under the lower tray 20, to provide the buoyancy; and water or liquid is introduced to the upper tray cells 11 through space between the upper and lower trays 10, 20.

As will be readily apparent to those skilled in the art, the present invention may easily be produced in other specific forms without departing from its scope or essential characteristics. The present embodiments are, therefore, to be considered as merely illustrative and not restrictive, the scope of the invention being indicated by the claims rather than the foregoing description, and all changes which come within therefore intended to be embraced therein.

The invention claimed is:

1. A floatable plant growth system, said system comprising:
   an upper tray having a plurality of downwardly tapering cells for receiving plant growth material, each of the plant cells having an opening at its bottom;
   a lower tray having a plurality of upwardly tapering cells that trap air, enabling the system to float in use;
   said upper tray removably mateable with said lower tray and positioned to float on a body of liquid such that the plant cells of said upper tray are located in the space between the air cells of said lower tray; and
   said lower tray provided with a plurality of openings distributed only at a perimeter of said lower tray, said openings enabling entry of liquid into a space between the mated configuration of the upper and lower trays to fill the space below the upper tray plant cells to a predetermined depth, and to be taken up through the bottom opening of each plant cell such that said bottom opening of said plant cells are located a predetermined distance above said body of liquid.

2. The system as claimed in claim 1, wherein said upper tray further comprises intercellular bridges disposed such that each bridge is seated on a lower tray air cell, when the upper and lower trays are mated together.

3. The system as claimed in claim 1 or claim 2, wherein the upwardly tapered air cells of said lower tray have a different gradient relative to the downwardly tapered plant cells of said upper tray.

4. The system as claimed in claim 1, wherein each of said plant cells comprises a suitably shaped pocket with an open top.

5. The system as claimed in claim 1, wherein each plant cell further comprises ridges on the internal surface of its tapered sides.

6. The system as claimed in claim 1, wherein each of said air cells comprises a suitably shaped pocket with a blind top end and an open bottom end.

7. The system as claimed in claim 1, wherein said lower tray further comprises a rib.

8. The system as claimed in claim 7, wherein said lower tray rib is a hollow rib.

9. The system as claimed in claim 7 or claim 8 wherein said rib is provided about the perimeter of the lower tray.

10. The system as claimed in claim 9, wherein said lower tray perimeter rib further comprises a plurality of portions of reduced height distributed along the length of said rib.

11. The system as claimed in claim 10, wherein each of said portions of reduced height of the perimeter rib further comprises an opening.

12. The system as claimed in claim 1 wherein said upper and lower trays are made of different materials and/or materials of different properties.

13. The system as claimed in claim 1, wherein both said upper and lower trays are made of plastic material.

14. The system as claimed in claim 13, wherein said lower tray is made of thick gauge virgin plastic material.

15. The system as claimed in claim 13 or claim 14, wherein both said upper and lower trays are made of polystyrene.

16. The system as claimed in claim 13 or claim 14, wherein both said upper and lower trays are made of polypropylene.

17. A floatation tray for use in the floatation of plant-holding structures in a body of liquid, said tray comprising:
   a floatation tray comprising a plurality of upwardly tapering cells that trap air, enabling said tray to float on a body of liquid when in use, said plant-holding structures supported on said upwardly tapering cells in the space between said air cells;
   a rib provided about a perimeter of said tray; and
   a plurality of openings formed in a floor of said tray, said openings distributed only at the perimeter of said tray and positioned internally adjacent to said rib;
   whereby, in use, liquid flows on top of said tray through said openings, and fills a space between the air cells of said tray and said plant holding structures to a predetermined depth such that said plant holding structures are located a predetermined distance above said body of liquid when said tray is floated thereon.

18. The tray as claimed in claim 17, wherein said rib is a hollow rib.

* * * * *